United States Patent
Lee et al.

(10) Patent No.: US 10,341,156 B2
(45) Date of Patent: *Jul. 2, 2019

(54) PHASE PATTERN-BASED SYNCHRONIZATION SIGNAL TRANSMITTING/RECEIVING METHOD IN WIRELESS COMMUNICATION SYSTEM

(71) Applicant: LG Electronics Inc., Seoul (KR)

(72) Inventors: Kilbom Lee, Seoul (KR); Jiwon Kang, Seoul (KR); Kitae Kim, Seoul (KR); Kungmin Park, Seoul (KR); Heejin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/570,555

(22) PCT Filed: Jan. 20, 2016

(86) PCT No.: PCT/KR2016/000591
§ 371 (c)(1),
(2) Date: Oct. 30, 2017

(87) PCT Pub. No.: WO2016/178469
PCT Pub. Date: Nov. 10, 2016

(65) Prior Publication Data
US 2018/0145861 A1    May 24, 2018

Related U.S. Application Data

(60) Provisional application No. 62/157,425, filed on May 5, 2015.

(51) Int. Cl.
*H04J 11/00* (2006.01)
*H04L 27/26* (2006.01)
(Continued)

(52) U.S. Cl.
CPC ...... *H04L 27/2643* (2013.01); *H04J 11/0069* (2013.01); *H04L 27/2613* (2013.01);
(Continued)

(58) Field of Classification Search
CPC .......... H04L 27/2643; H04L 27/2613; H04W 56/0035
See application file for complete search history.

(56) References Cited

U.S. PATENT DOCUMENTS 5,862,005 A * 1/1999 Leis .................... G11B 5/5526
360/27
2006/0269008 A1 11/2006 Bohnke et al.
(Continued)

*Primary Examiner* — Mohammad S Anwar
(74) *Attorney, Agent, or Firm* — Dentons US LLP

(57) ABSTRACT

Disclosed is a synchronization signal receiving method comprising a step of respectively receiving, from a plurality of base stations, a plurality of synchronization signals generated by using a predetermined repetition frequency, sequence, and phase pattern vector, measuring a start timing of a frame, a sequence index, and an index of the phase pattern vector by using the plurality of synchronization signals with respect to each of the plurality of base stations, selecting the base station having the highest correlation value calculated as a result of the measurement among the plurality of base stations, and establishing a connection with the selected base station, wherein the phase pattern vector repeatedly changes the phase of the sequence at the repetition frequency.

14 Claims, 7 Drawing Sheets

(51) Int. Cl.
*H04W 56/00* (2009.01)
*H04W 74/00* (2009.01)

(52) U.S. Cl.
CPC ...... *H04L 27/2656* (2013.01); *H04L 27/2657* (2013.01); *H04L 27/2692* (2013.01); *H04W 56/0035* (2013.01); *H04W 74/004* (2013.01)

(56) References Cited

U.S. PATENT DOCUMENTS

| | | |
|---|---|---|
| 2008/0174581 A1* | 7/2008 | Matsumoto ........ G01M 11/0257 345/205 |
| 2010/0135238 A1 | 6/2010 | Sadri et al. |
| 2011/0158164 A1 | 6/2011 | Palanki et al. |
| 2012/0314818 A1 | 12/2012 | Li et al. |
| 2014/0029698 A1 | 1/2014 | Bohnke et al. |

* cited by examiner (a)  (b)

PHASE PATTERN-BASED SYNCHRONIZATION SIGNAL TRANSMITTING/RECEIVING METHOD IN WIRELESS COMMUNICATION SYSTEM

This application is a National Stage Entry of International Application No. PCT/KR2016/000591, filed Jan. 20, 2016, and claims the benefit of U.S. Provisional Application No. 62/157,425, filed on May 5, 2015, which are hereby incorporated by reference for all purposes as if fully set forth herein.

TECHNICAL FIELD

The present invention relates to a wireless communication system, and more particularly, to a method of transmitting and receiving a synchronization signal based on a phase pattern in a wireless LAN system and performing a beam scanning and apparatus therefor.

BACKGROUND ART

An ultrahigh frequency wireless communication system based on mmWave is configured to operate at a center frequency of several GHz to several tens of GHz. Doppler effect generated by movement of a UE or carrier frequency offset (CFO) generated by a difference in oscillators between a UE and a BS occurs more seriously due to the characteristic of the center frequency configured at an ultrahigh frequency. This is because that the Doppler effect is characterized in linearly increased with respect to the center frequency and CFO expressed by ppm ($10^{-6}$) is also characterized in linearly increased with respect to the center frequency.

In a cellular network of the related art, a transmitter transmits a reference symbol, and a receiver estimates and compensates for CFO by using the reference symbol. Therefore, in the ultrahigh frequency wireless communication system, another synchronization signal transmission method for estimating/compensating for CFO generated more significantly than the related art should be suggested.

DISCLOSURE OF THE INVENTION

Technical Task

The present invention is directed to solve the above problems of the general technology, and one technical task of the present invention is to enable a user equipment to efficiently receive synchronization signals from a plurality of base stations in a communication system that uses an ultrahigh frequency band.

Another technical task of the present invention is to improve complexity and memory demand in the course of processing a received synchronization signal.

Further technical task of the present invention is to lower complexity of sequence assignment among a plurality of adjacent base stations.

The technical problems solved by the present invention are not limited to the above technical problems and other technical problems which are not described herein will become apparent to those skilled in the art from the following description.

Technical Solutions

In one technical aspect of the present invention, provided herein is a method of receiving a synchronization signal by a user equipment in a wireless communication system, including receiving a plurality of synchronization signals generated using a predetermined repetition count, a sequence and a phase pattern vector from a plurality of base stations, respectively, measuring a start timing of a frame, a sequence index and an index of a phase pattern vector using the plurality of synchronization signals, selecting a base station having a highest correlation value calculated as a result of the measurement from the plurality of base stations, and establishing a connection to the selected base station, wherein the phase pattern vector is used for the base station to change a phase of the sequence by the repetition count.

At least one of the sequence and the phase pattern vector may be assigned differently between adjacent base stations.

Phase pattern vectors corresponding to an identical sequence and an identical repetition count may be orthogonal or quasi-orthogonal to each other.

Different sequence bands may be assigned between base stations having different repetition counts set therefor.

The measuring may be performed based on an equation as follows:

$$\{\hat{n}, \hat{M}, \hat{k}, \hat{t}\} = \arg\max_{\tilde{n}, \tilde{M}, \tilde{k}, \tilde{t}} \left| \sum_{i=0}^{\tilde{M}-1} (x_{i,\tilde{M}}^{\tilde{t}})^* y_{\tilde{n},i}^H s_{\tilde{k}} \right|^2, \quad \text{[Equation]}$$

where $\hat{n}$ may indicate a start timing of the measured frame, $\hat{M}$ may indicate the measured repetition count, $\hat{k}$ may indicate the measured sequence index, $\hat{t}$ may indicate an index of the measured phase pattern vector, $y_{\tilde{n},i}$ may indicate the received synchronization signal, and $s_{\tilde{k}}$ may indicate a signal transmitted by the base station, $\tilde{n}$, $\tilde{M}$, $\tilde{k}$, and $\tilde{t}$ may indicate trial values used for a process for calculating the equation, and $x_{i,\tilde{M}}^{\tilde{t}}$ may indicate an $i^{th}$ element of a phase pattern vector having a repetition count $\tilde{M}$ and an index $\tilde{t}$.

The selecting may include selecting the base station by updating the measurement result during a window in a prescribed size.

The selecting may include stopping the measuring if the measurement result is equal to or greater than a threshold during a window in a prescribed size.

In another technical aspect of the present invention, provided herein is a user equipment receiving a synchronization signal in a wireless communication system, including a transmitter, a receiver, and a processor configured to operate by being connected to the transmitter and the receiver, wherein the processor controls the receiver to receive a plurality of synchronization signals generated using a predetermined repetition count, a sequence and a phase pattern vector from a plurality of base stations, respectively, measures a start timing of a frame, a sequence index and an index of a phase pattern vector using the plurality of synchronization signals, selects a base station having a highest correlation value calculated as a result of the measurement from the plurality of base stations, and establishes a connection to the selected base station and wherein the phase pattern vector is used for the base station to change a phase of the sequence by the repetition count.

Advantageous Effects

According to embodiments of the present invention, the following effects are expected.

First of all, efficiency of a process for a user equipment to receive a synchronization signal and establish a connection to a base station in a communication system of an ultrahigh frequency band can be improved.

Secondly, since a sequence can be reutilized between adjacent base stations by introducing a phase pattern vector, network implementation complexity can be improved.

Thirdly, since a process for handling a received synchronization signal can be efficiently improved in aspect of a user equipment, implementation complexity and memory demand can be reduced.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

BEST MODE FOR INVENTION

Figure 1:
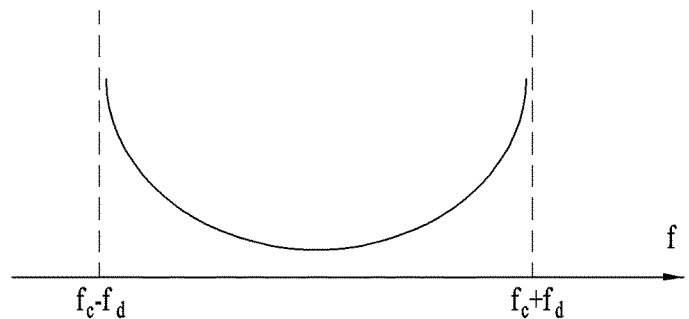
FIG. 1 is a diagram illustrating a Doppler spectrum.

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

In this document, the embodiments of the present invention have been described centering on a data transmission and reception relationship between a mobile station and a base station. The base station may mean a terminal node of a network which directly performs communication with a mobile station. In this document, a specific operation described as performed by the base station may be performed by an upper node of the base station.

Namely, it is apparent that, in a network comprised of a plurality of network nodes including a base station, various operations performed for communication with a mobile station may be performed by the base station, or network nodes other than the base station. The term base station may be replaced with the terms fixed station, Node B, eNode B (eNB), advanced base station (ABS), access point, etc.

The term mobile station (MS) may be replaced with user equipment (UE), subscriber station (SS), mobile subscriber station (MSS), mobile terminal, advanced mobile station (AMS), terminal, etc.

A transmitter refers to a fixed and/or mobile node for transmitting a data or voice service and a receiver refers to a fixed and/or mobile node for receiving a data or voice service. Accordingly, in uplink, a mobile station becomes a transmitter and a base station becomes a receiver. Similarly, in downlink transmission, a mobile station becomes a receiver and a base station becomes a transmitter.

Communication of a device with a "cell" may mean that the device transmit and receive a signal to and from a base station of the cell. That is, although a device substantially transmits and receives a signal to a specific base station, for convenience of description, an expression "transmission and reception of a signal to and from a cell formed by the specific base station" may be used. Similarly, the term "macro cell"

and/or "small cell" may mean not only specific coverage but also a "macro base station supporting the macro cell" and/or a "small cell base station supporting the small cell".

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

1. Communication System Using Ultrahigh Frequency Band

In an LTE (Long Term Evolution)/LTE-A (LTE Advanced) system, an error value of oscillators between a UE and an eNB is defined by requirements as follows.

UE side frequency error (in TS 36.101)

The UE modulated carrier frequency shall be accurate to within ±0.1 PPM observed over a period of one time slot (0.5 ms) compared to the carrier frequency received from the E-UTRA Node B eNB side frequency error (in TS 36.104)

Frequency error is the measure of the difference between the actual BS transmit frequency and the assigned frequency.

Meanwhile, oscillator accuracy according to types of BS is as listed in Table 1 below.

TABLE 1

| BS class | Accuracy |
| --- | --- |
| Wide Area BS | ±0.05 ppm |
| Local Area BS | ±0.1 ppm |
| Home BS | ±0.25 ppm |

Therefore, a maximum difference in oscillators between a BS and a UE is ±0.1 ppm, and when an error occurs in one direction, an offset value of maximum 0.2 ppm may occur. This offset value is converted to a unit of Hz suitable for each center frequency by being multiplied by the center frequency.

Meanwhile, in an OFDM system, a CFO value is varied depending on a subcarrier spacing. Generally, the OFDM system of which subcarrier spacing is sufficiently great is relatively less affected by even a great CFO value. Therefore, an actual CFO value (absolute value) needs to be expressed as a relative value that affects the OFDM system. This will be referred to as normalized CFO. The normalized CFO is expressed as a value obtained by dividing the CFO value by the subcarrier spacing. The following Table 2 illustrates CFO of an error value of each center frequency and oscillator and normalized CFO.

TABLE 2

| Center frequency | Oscillator Offset | | | |
| --- | --- | --- | --- | --- |
| (subcarrier spacing) | ±0.05 ppm | ±0.1 ppm | ±10 ppm | ±20 ppm |
| 2 GHz (15 kHz) | ±100 Hz (±0.0067) | ±200 Hz (±0.0133) | ±20 kHz (±1.3) | ±40 kHz (±2.7) |
| 30 GHz (104.25 kHz) | ±1.5 kHz (±0.014) | ±3 kHz (±0.029) | ±300 kHz (±2.9) | ±600 kHz (±5.8) |
| 60 GHz (104.25 kHz) | ±3 kHz (±0.029) | ±6 kHz (±0.058) | ±600 kHz (±5.8) | ±1.2 MHz (±11.5) |

In Table 2, it is assumed that a subcarrier spacing is 15 kHz when the center frequency is 2 GHz (for example, LTE Rel-8/9/10). When the center frequency is 30 GHz or 60 GHz, a subcarrier spacing of 104.25kHz is used, whereby throughput degradation is avoided considering Doppler effect for each center frequency. The above Table 2 is a simple example, and it will be apparent that another subcarrier spacing may be used for the center frequency.

Meanwhile, Doppler spread occurs significantly in a state that a UE moves at high speed or moves at a high frequency band. Doppler spread causes spread in a frequency domain, whereby distortion of a received signal is generated in view of the receiver. Doppler spread may be expressed as $f_{doppler}=(v/\lambda)\cos\theta$. At this time, v is a moving speed of the UE, and λ means a wavelength of a center frequency of a radio wave which is transmitted. θ means an angle between the radio wave and a moving direction of the UE. Hereinafter, description will be given on the assumption that θ is 0.

At this time, a coherence time is inverse proportion to Doppler spread. If the coherence time is defined as a time spacing of which correlation value of a channel response in a time domain is 50% or more, the coherence time is expressed as $$T_c \approx \frac{9}{16\pi f_{doppler}}.$$

In the wireless communication system, the following Equation 1 which indicates a geometric mean between an equation for Doppler spread and an equation for the coherence time is used mainly.

$$T_c = \sqrt{\frac{9}{16\pi f_{doppler}}} = \frac{0.423}{f_{doppler}} \qquad \text{[Equation 1]}$$

FIG. 1 is a diagram illustrating a Doppler spectrum.

A Doppler spectrum or Doppler power spectrum density, which indicates a change of a Doppler value according to a frequency change, may have various shapes depending on a communication environment. Generally, in an environment, such as downtown area, where scattering occurs frequently, if received signals are received at the same power in all directions, the Doppler spectrum is indicated in the form of U-shape as shown in FIG. 1. FIG. 1 shows a U-shaped Doppler spectrum when the center frequency is $f_c$ and a maximum Doppler spread value is $f_d$.

Figure 2:
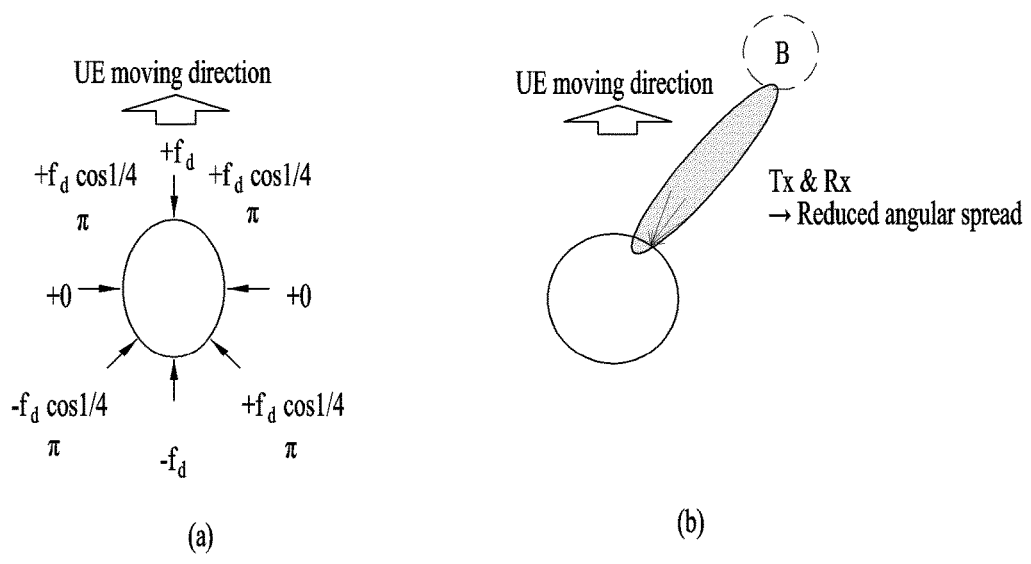
FIG. 2 is a diagram illustrating narrow beamforming related to the present invention.
Figure 3:
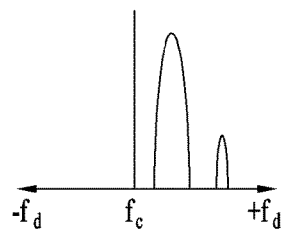
FIG. 3 is a diagram illustrating a Doppler spectrum when narrow beamforming is performed.

FIG. 2 is a diagram illustrating narrow beamforming related to the present invention, and FIG. 3 is a diagram illustrating a Doppler spectrum when narrow beamforming is performed.

In the ultrahigh frequency wireless communication system, since the center frequency is located at a very high band, a size of an antenna is small and an antenna array comprised of a plurality of antennas may be installed in a small space. This characteristic enables pin-point beamforming, pencil beamforming, narrow beamforming, or sharp beamforming, which is based on several tens of antennas to several hundreds of antennas. This narrow beamforming means that a received signal is received at a certain angle only not a constant direction.

FIG. 2(a) illustrates that a Doppler spectrum is represented in the form of U-shape depending on a signal received in a constant direction, and FIG. 2(b) illustrates that narrow beamforming based on a plurality of antennas is performed.

As described above, if narrow beamforming is performed, the Doppler spectrum is represented to be narrower than U-shape due to reduced angular spread. As shown in FIG. 3, it is noted from the Doppler spectrum when narrow beamforming is performed that Doppler spread is generated at a certain band only.

The aforementioned wireless communication system using the ultrahigh frequency band operates on a band having a center frequency ranging from several GHz to several tens of GHz. The characteristics of such a center frequency further worsen Doppler Effect generated from migration of a user equipment or influence of CFO due to an oscillator difference between a transmitter and a receiver.

Figure 4:
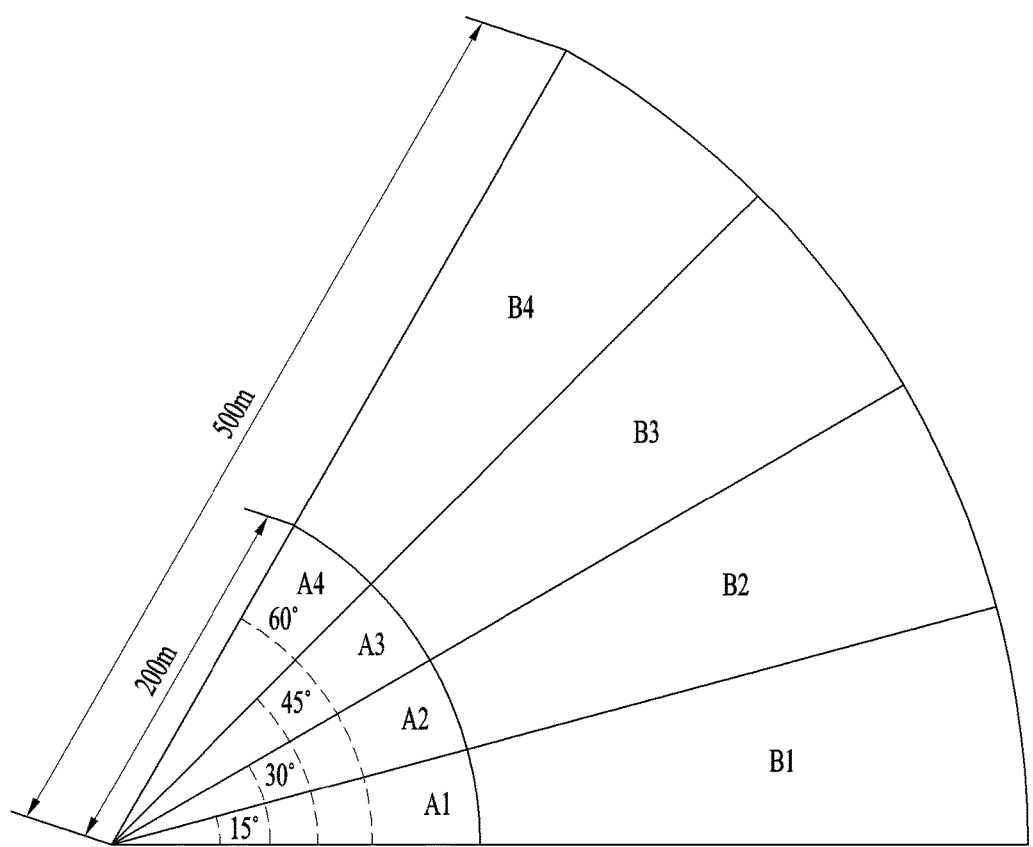
FIG. 4 is a diagram showing an example of a synchronization signal service area of a base station.

FIG. 4 is a diagram showing an example of a synchronization signal service area of a base station.

A user equipment (hereinafter abbreviated UE) performs synchronization with a base station using a downlink (DL) synchronization signal transmitted by the base station. In such a synchronization process, timing and frequency are synchronized between the base station and the UE. In order to enable UEs in a specific cell to receive and use a synchronization signal in a synchronization process, the base station transmits the synchronization signal by configuring a beam width as wide as possible.

Meanwhile, in case of an mm Wave communication system that uses a high frequency band, a path loss in a synchronization signal transmission appears greater than that of a case of using a low frequency band. Namely, a system using a high frequency band has a supportable cell radius reduced more than that of a related art cellular system (e.g., LTE/LTE-A) using a relatively low frequency band (e.g., 6 GHz or less).

As a method for solving the reduction of the cell radius, a synchronization signal transmitting method using a beamforming may be used. Although a cell radius increases in case of using a beamforming, a beam width is reduced disadvantageously. Equation 2 shows variation of a received signal SINR according to a beam width.

$$W \to M^{-2}W$$

$$SINR \to M^2 SINR \quad \text{[Formula 2]}$$

If a beam width is reduced by $M^{-2}$ time according to a beamforming, Equation 2 indicates that a received SINR is improved by $M^2$ times.

Beside such a beamforming scheme, as another method for solving the cell radius reduction, it is able to consider a scheme of transmitting a same synchronization signal repeatedly. In case of such a scheme, although an addition resource allocation is necessary or a time axis, a cell radius can be advantageously increased without a decrease of a beam width.

Meanwhile, a base station allocates a resource to each UE by scheduling a frequency resource and a time resource located in a specific section. In the following, such a specific section shall be defined as a sector. In the sector shown in FIG. 4, A1, A2, A3 and A4 indicate sectors having widths of 0~15', 15~30', 30~45' and 45~60' in radius of 0~200 m, respectively. B1, B2, B3 and B4 indicate sectors having widths of 0~15', 15~30', 30~45' and 45~60' in radius of 200~500 m, respectively. Based on the substance shown in FIG. 4, sector 1 is defined as {A1, A2, A3, A4} and sector 2 is defined as {A1, A2, A3, A4, B1, B2, B3, B4}. Moreover, if a current synchronization signal service area of a base station is the sector 1, in order for the base station to service a synchronization signal for the sector 2, assume that an additional power over 6 dB is required for a transmission of a synchronization signal.

First of all, in order to service the sector 2, the base station can obtain an additional gain of 6 dB using a beamforming scheme. Through such a beamforming process, a service radius can be extended from A1 to B1. Yet, since a beam width is reduced through the beamforming, A2 to A3 cannot be serviced simultaneously. Hence, when a beamforming is performed, a synchronization signal should be sent to each of the A2~B2, A3~B3, and A4~B4 sectors separately. So to speak, in order to service the sector 2, the base station should transmit the synchronization signal by performing the beamforming four times.

On the other hand, considering the aforementioned repetitive transmission of the synchronization signal, the base station may be able to transmit the synchronization signal to the whole sector 2. Yet, the synchronization signal should transmit the synchronization signal on a time axis repeatedly four times. Consequently, a resource necessary to service the sector 2 is identical for both a beamforming scheme and a repetitive transmission scheme.

Yet, since a beam width is narrow in case of to beamforming scheme, a UE moving fast or a UE located on a sector boundary has difficulty in receiving a synchronization signal stably. Instead, if an ID of a UE located beam is identifiable, a UE can advantageously grasp its location through a synchronization signal. On the contrary, since a beam width is wide in case of a repetitive transmission scheme, it is less probable that a UE misses a synchronization signal. Instead, the UE is unable to grasp its location.

Figure 5:
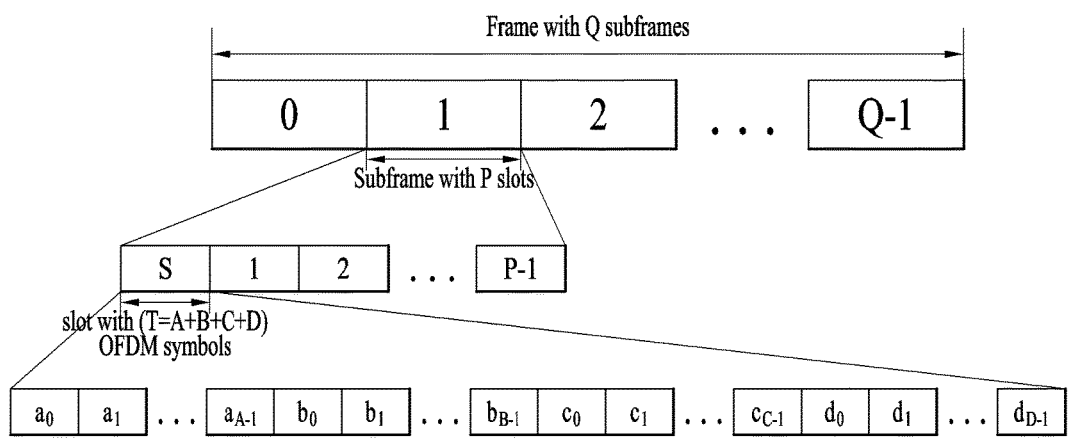
FIG. 5 shows an example of a frame structure proposed in a communication environment that uses mmWave.

FIG. 5 shows an example of a frame structure proposed in a communication environment that uses mmWave.

First of all, a single frame is configured with Q subframes, and a single subframe is configured with P slots. And, one slot is configured with T OFDM symbols. Here, unlike other subframes, a first subframe in a frame uses $0^{th}$ slot (slot denoted by 'S') for the usage of synchronization. And, the $0^{th}$ slot is configured with A OFDM symbols for timing and frequency synchronization, B OFDM symbols for beam scanning, and C OFDM symbols for informing a UE of system information. And, the remaining D OFDM symbols are used for data transmission to each UE.

Meanwhile, such a frame structure is a simple example only. Q, P, T, S, A, B, C and D are random values, and may include values set by a user or values set automatically on a system.

In the following, algorithm of timing synchronization between a base station and a UE is described. Let's consider a case that the base station transmits the same synchronization signal A times in FIG. 5. Based on the synchronization signal transmitted by the base station, the UE performs timing synchronization using the algorithm of Equation 3.

$$\hat{n} = \arg\max_{\tilde{n}} \frac{\left|\sum_{i=0}^{A-2} y_{\tilde{n},i}^H y_{\tilde{n},i+1}\right|}{\sum_{i=0}^{A-2} |y_{\tilde{n},i}^H y_{\tilde{n},i+1}|} \quad \text{[Equation 3]}$$

where $y_{\tilde{n},i} \triangleq r[\tilde{n}+i(N+N_g):\tilde{n}+i(N+N_g)+N-1]$

In Equation 3, N, $N_g$ and i indicate a length of OFDM symbol, a length of CP (Cyclic Prefix) and an index of OFDM symbol, respectively. r means a vector of a received signal in a receiver. Here, the equation $y_{\tilde{n},i} \triangleq r[\tilde{n}+i(N+N_g):\tilde{n}+i(N+N_g)+N-1]$ is a vector defined with elements ranging from $(\tilde{n}+i(N+N_g))^{th}$ element to $(\tilde{n}+i(N+N_g)+N-1)^{th}$ of the received signal vector r.

The algorithm of Equation 3 operates on the condition that 2 OFDM received signals adjacent to each other temporally are equal to each other. Since such an algorithm can use a sliding window scheme, it can be implemented with low complexity and has a property robust to a frequency offset.

Meanwhile, Equation 4 represents an algorithm of performing timing synchronization using correlation between a received signal and a signal transmitted by a base station.

$$\hat{n} = \arg\max_{\tilde{n}} \frac{\left|\sum_{i=0}^{A-1} y_{\tilde{n},i}^H s\right|^2}{\sum_{i=0}^{A-1} |y_{\tilde{n},i}|^2 \sum_{i=0}^{A-1} |s|^2} \quad \text{[Equation 4]}$$

In Equation 4, s means a signal transmitted by a base station and is a signal vector pre-agreed between a UE and a base station. Although the way of Equation 4 may have performance better than that of Equation 3, since Equation 4 cannot be implemented by a sliding window scheme, it requires high complexity. And, the way of Equation 4 has a property vulnerable to a frequency offset.

In continuation with the description of the timing synchronization scheme, a beam scanning process is described as follows. First of all, a beam scanning means an operation of a transmitter and/or a receiver that looks for a direction of a beam that maximizes a received SINR of the receiver. For example, a base station determines a direction of a beam through a beam scanning before transmitting data to a UE.

Further description is made by taking FIG. 4 as one example. FIG. 4 shows that a sector serviced by a single base station is divided into 8 areas. Here, the base station transmits a beam to each of (A1+B1), (A2+B2), (A3+B3) and (A4+B4) areas, and a UE can identify the beams transmitted by the base station. On this condition, a beam scanning process can be embodied into 4 kinds of processes. First of all, the base station transmits beams to 4 areas in sequence [i]. The UE determines a beam decided as a most appropriate beam among the beams in aspect of a received SINR [ii]. The UE feds back information on the selected beam to the base station [iii]. The base station transmits data using a beam having the direction of the feedback [iv]. Through the above beam scanning process, the UE can receive DL data through a beam having an optimized received SINR.

Zadoff-Chu sequence is described in the following. Zadoff-Chu sequence is called Chu sequence or ZC sequence and defined as Equation 5.

$$x_r[n] = e^{\frac{j\pi rn(n+1)}{N}} \quad \text{[Equation 5]}$$

In Equation 5, N indicates a length of sequence, r indicates a root value, and $x_r[n]$ indicates an $n^{th}$ element of ZC sequence. The ZC sequence is characterized in that all elements are equal to each other in size [constant amplitude]. Moreover, a DFT result of ZC sequence is also identical for all elements.

In the following, ZC sequence and a cyclic shifted version of the ZC sequence have the following correlation such as Equation 6.

$$(x_r^{(i)})^H x_r^{(j)} = \begin{cases} N & \text{for } i = j \\ 0 & \text{elsewhere} \end{cases} \quad \text{[Equation 6]}$$

In Equation 6, $x_r^{(i)}$ is a sequence resulting from cyclic-shifting $x_r$ by i, and indicates 0 except a case that auto-correlation of ZC sequence is i=j. The ZC sequence also has zero auto-correlation property and may be expressed as having CAZAC (Constant Amplitude Zero Auto Correlation) property.

Regarding the final property of the ZC sequence ZC, the correlation shown in Equation 7 is established between ZC sequences having a root value that is a coprime of a sequence length N.

$$x_{r_1}^H x_{r_2} = \begin{cases} N & \text{for } r_1 = r_2 \\ \frac{1}{\sqrt{N}} & \text{elsewhere} \end{cases} \quad \text{[Equation 7]}$$

In equation 7, $r_1$ or $r_2$ is a coprime of N. For example, if N=111, $2 \leq r_1, r_2 \leq 110$ always meets Equation 7. Unlike auto-correlation of Equation 6, the mutual correlation of ZC sequence does not become 0 completely.

In continuation with ZC sequence, Hadamard matrix is described. The Hadamard matrix is defined as Equation 8.

$$H_{2^k} = \begin{bmatrix} H_{2^{k-1}} & H_{2^{k-1}} \\ H_{2^{k-1}} & -H_{2^{k-1}} \end{bmatrix} = H_2 \otimes H_{2^{k-1}} \quad \text{[Equation 8]}$$

where $H_1 = [1]$ $H_2 = \begin{bmatrix} 1 & 1 \\ 1 & -1 \end{bmatrix}$

In Equation 8, $2^k$ indicates a size of matrix. Hadamard matrix is a unitary matrix that always meets $H_n H_n^T = nI_n$ irrespective of a size n. Moreover, in Hadamard matrix, all columns and all rows are orthogonal to each other. For example, if n=4, Hadamard matrix is defined as Equation 9.

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad [\text{Equation 9}]$$

From Equation 9, it can be observed that columns and rows are orthogonal to each other.

Figure 6:
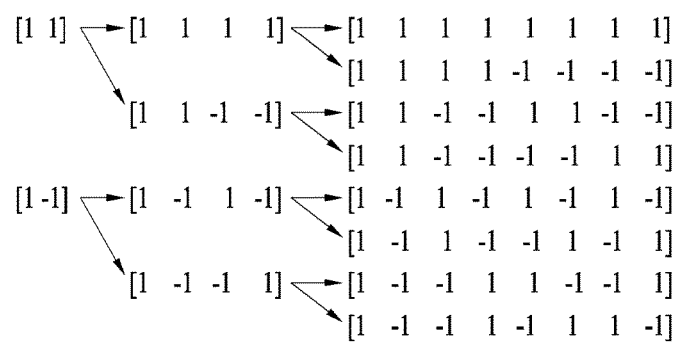
FIG. 6 shows a structure of OVSF (orthogonal variable spreading factor) code.

FIG. 6 shows a structure of OVSF (orthogonal variable spreading factor) code. The OVSF code is the code generated on the basis of Hadamard matrix and has specific rules.

First of all, in diverging to the right in the OVSF code [lower branch], a first code repeats a left mother code twice as it is and a second code is generated from repeating an upper code once, inverting it and then repeating the inverted code once. FIG. 6 shows a tree structure of OVSF code.

Such an OVSF code secures all orthogonality except the relation between adjacent mother and child codes on a code tree. For example, in FIG. 6, a code [1 −1 1 −1] is orthogonal to all of [1 1 ], [1 1 1 1], and [1 1 −1 −1]. Moreover, regarding the OVSF code, a length of code is equal to the number of available codes. Namely, it can be observed from FIG. 6 that a length of a specific ode is equal to the total number in a branch having the corresponding code belong thereto.

Figure 7:
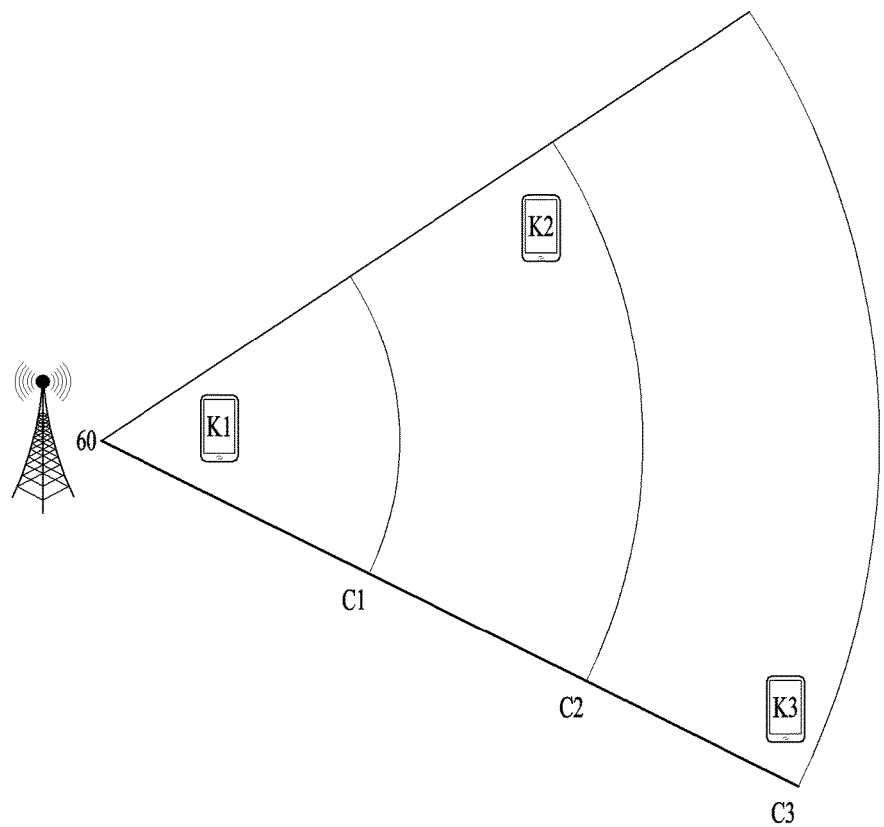
FIG. 7 is a diagram to describe a disposed situation of user equipments.

FIG. 7 is a diagram to describe a disposed situation of user equipments. RACH (Random Access CHannel) is described with reference to FIG. 7.

In case of LTE system, when RACH signals transmitted by UEs arrive at a base station, powers of the RACH signals of UEs received by the base station should be equal to each other. To this end, the base station defines a parameter 'preambleInitialReceivedTargetPower', thereby broadcasting the parameter to all UEs within a corresponding cell through SIB (System Information Block) 2. The UE calculates a pathloss using a reference signal, and then determines a transmit power of the RACH signal using the calculated pathloss and the parameter 'preambleInitialReceivedTargetPower' like Equation 10.

P_PRACH_Initial=min{P_CMAX,preambleInitialReceivedTargetPower+PL} [Equation 10]

In Equation 10, P_PRACH_Initial, P_CMAX, and PL indicate a transmit power of RACH signal, a maximum transmit power of UE, and a pathloss, respectively.

Equation 10 is taken as one example for the following description. A maximum transmittable power of UE is assumed as 23 dBm, and a RACH reception power of a base station is assumed as −104 dBm. And, a UE disposed situation is assumed as FIG. 7.

First of all, a UE calculates a pathloss using a received synchronization signal and a beam scanning signal and then determines a transmit power based on the calculation. Table 3 shows a pathloss of UE and a corresponding transmit power.

TABLE 3

| UE | preambleInitialReceivedTargetPower | Pathloss | Necessary transmit power | Transmit power | Additional necessary power |
|---|---|---|---|---|---|
| K1 | −104 dBm | 60 dB | −44 dBm | −44 dBm | 0 dBm |
| K2 | −104 dBm | 110 dB | 6 dBm | 6 dBm | 0 dBm |
| K3 | −104 dBm | 130 dB | 26 dBm | 23 dBm | 3 dBm |

In case of a UE K1 in table 3, a pathloss is very small. Yet, in order to match an RACH reception power, an RACH signal should be transmitted with very small power (−44 dBm). Meanwhile, in case of a UE K2, although a pathloss is big, a necessary transmit power is 6 dBm. Yet, in case of a UE K3, since a pathloss is very big, a necessary transmit power exceeds P_CMA=23 dBm. In this case, the UE should perform a transmission with 23 dBm that is a maximum transmit power and a rate of UE's RACH access success is degraded by 3 dB.

Figure 8:
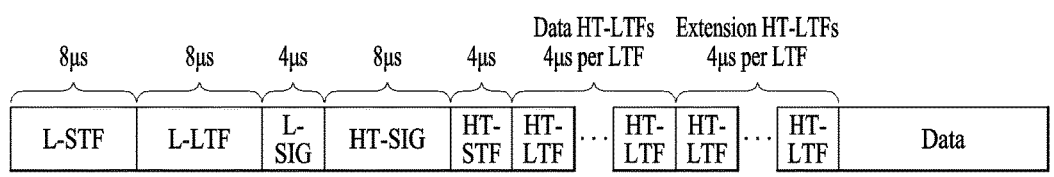
FIG. 8 shows a frame structure in HT (high throughput) system.
Figure 9:
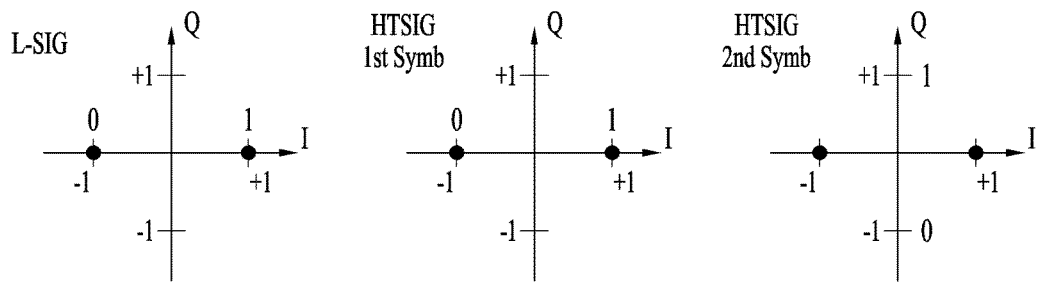
FIG. 9 shows constellation of data symbol mapping in HT system.

FIG. 8 shows a frame structure in HT (high throughput) system. FIG. 9 shows constellation of data symbol mapping in HT system.

FIG. 8 shows a frame structure of HT system on a time axis. L-SIG and HT-SIG indicate Legacy-Signal Field and High Throughput-Signal Field, respectively. If 1 OFDM symbol length is defined as 4 us, L-SIG corresponds to 1 OFDM but HT-SIG corresponds to 2 OFDM symbols.

In 802.11n system that is HT system, system information is transmitted to a UE using a frame of such a structure and such information is transmitted by being mapped to the constellation shown in FIG. 9. It can be observed from FIG. 9 that a first symbol of each of L-SIG and HT-SIG is mapped to BPSK (Binary Phase Shift Keying) and that a second symbol of HT-SIG is mapped to QBPSK (Quadrature BPSK).

Figure 10:
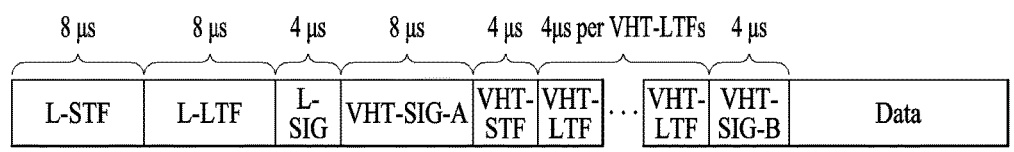
FIG. 10 shows a frame structure in VHT (very high throughput) system.
Figure 11:
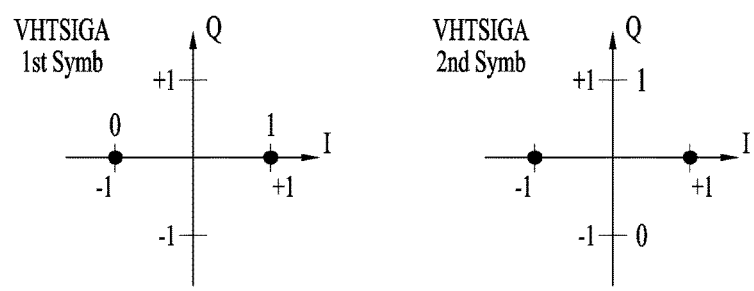
FIG. 11 shows constellation in VHT system.

FIG. 10 shows a frame structure in VHT (very high throughput) system. FIG. 11 shows constellation in VHT system.

In FIG. 10 and FIG. 11, like FIG. 8 and FIG. 9, system information is transmitted to a UE using L-SIG and VHT-SIG-A (Very high Throughput-Signal-A). and, VHT-SIG-A is transmitted by being mapped to the constellation shown in FIG. 11.

CFO and an estimation/compensation process of CFO are described as follows. CFO is generated by an oscillator frequency difference of a transmitter/receiver and/or Doppler effect. CFO can be divided into an integer part and a fraction part (e.g., when CFO=2.5, an integer is CFO=2 and a fraction is CFO=0.5). The integer CFO results in cyclic-shifting a subcarrier by a corresponding value, and the fraction CFO causes interference between subcarriers. Hence, in aspect of a receiver, a process for measuring and compensating such CFO is necessarily required. In HT/VHT system, a CFO value is estimated using L-STF and L-LTF and the estimated CFP value is applied to a received OFDM symbol. Thus, influence of CFO is eliminated like Equation 11.

$$D(-\hat{\epsilon})y = D(-\hat{\epsilon})(D(\epsilon)x + n) \quad [\text{Equation 11}]$$

$$= D(\epsilon - \hat{\epsilon})x + n'$$

$$= D(\Delta\epsilon)x + n'$$

In Equation 11, $\epsilon$ indicate an original CFO value and $\hat{\epsilon}$ indicates a CFO value estimated from L-STF and L-LTF. 'y' means a received signal vector when CFO exists. 'x' means a received signal vector when CFO does not exist. 'n' means a noise vector. A diagonal matrix D(ϵ) is defined as Equation 12.

$$D(\epsilon) = \begin{bmatrix} 1 & 0 & & 0 \\ 0 & e^{j2\pi\epsilon/N} & \ddots & \\ & \ddots & \ddots & 0 \\ 0 & & 0 & e^{j2\pi\epsilon(N-1)/N} \end{bmatrix}$$ [Equation 12]

If a CFO value is perfectly estimated from L-STF and L-LTF ($\hat{\epsilon}=\epsilon$), CFO is completely eliminated from a received signal using Equation 11 (Δϵ=0). Yet, since a CFO value estimated from L-STF and L-LTF is not perfect ($\hat{\epsilon}\neq\epsilon$) and a CFO value slightly varies according to time, a residual CFO value is defined according to Equation 13.

Δϵ=ϵ−$\hat{\epsilon}$+$\tilde{\epsilon}$ [Equation 13]

In Equation 13, $\tilde{\epsilon}$ means a CFO value changed according to time. In order to re-estimate a residual CFO, a receiver uses a pilot signal existing in L-SIG and HT-SIG. Meanwhile, if FFT operation is applied to D($\hat{\epsilon}$)y in a state that a residual CFO fails to be completely eliminated (Δϵ≠0), a leakage signal is generated between subcarriers so as to lower a received SINR. Hence, CFO should be eliminated on a time axis using a CFO estimated value as accurate as possible so as to result in Δϵ≈0. Meanwhile, although distortion of a phase due to CFO can be corrected on a frequency axis, it is difficult to eliminate a leakage signal.

A process compensating CFO on a frequency axis is described as follows. First of all, CFO experienced by an nth OFDM symbol is defined as $\epsilon_n$. A CFO estimated value, which is used to eliminate CFO on a time axis, in an $n^{th}$ or $(n+1)^{th}$ OFDM symbol is named $\hat{\epsilon}_n$. Yet, since such an estimated value is not perfect ($\epsilon_n \approx \hat{\epsilon}_n$), there exists a residual CFO. Hence, a process for estimating a residual CFO using $n^{th}$ and $(n+1)^{th}$ OFDM symbols progresses, and an estimated residual CFO value is defined as $\Delta\hat{\epsilon}_n$.

Using the estimated residual CFO value, a receiver corrects a received signal ($r_k^l$) of a subcarrier according to Equation 14.

$\tilde{r}_k^l = r_k^l e^{-j2\pi\Delta\hat{\epsilon}(N+N_g)l/N}$, l=n,n+1 [Equation 14]

According to such a process, distortion of a phase due to a residual CFO can be compensated on a frequency axis. Meanwhile, unlike a process for eliminating CFO on a time axis, it is unable to remove influence of a leakage signal generated due to CFO. Hence, a CFO estimated value according to Equation 15 is used to eliminate CFO on a time axis by starting with $(n+2)^{th}$ and $(n+3)^{th}$ OFDM symbols.

[Formula 15]

$\hat{\epsilon}_{n+2} = \hat{\epsilon}_n + \Delta\hat{\epsilon}_n$

Since $\hat{\epsilon}_{n-2}$ is closer to $\epsilon_{n+2}$ than $\hat{\epsilon}_n$, a smaller residual CFO is induced. Hence, as a received signal on a frequency axis after FFT operation has smaller signal leakage, a received SINR is improved. Moreover, after estimating $\Delta\hat{\epsilon}_{n+2}$, a process for modifying a phase of a subcarrier received signal is performed.

2. Proposed Synchronization Signal Transceiving Method 1

Figure 12:
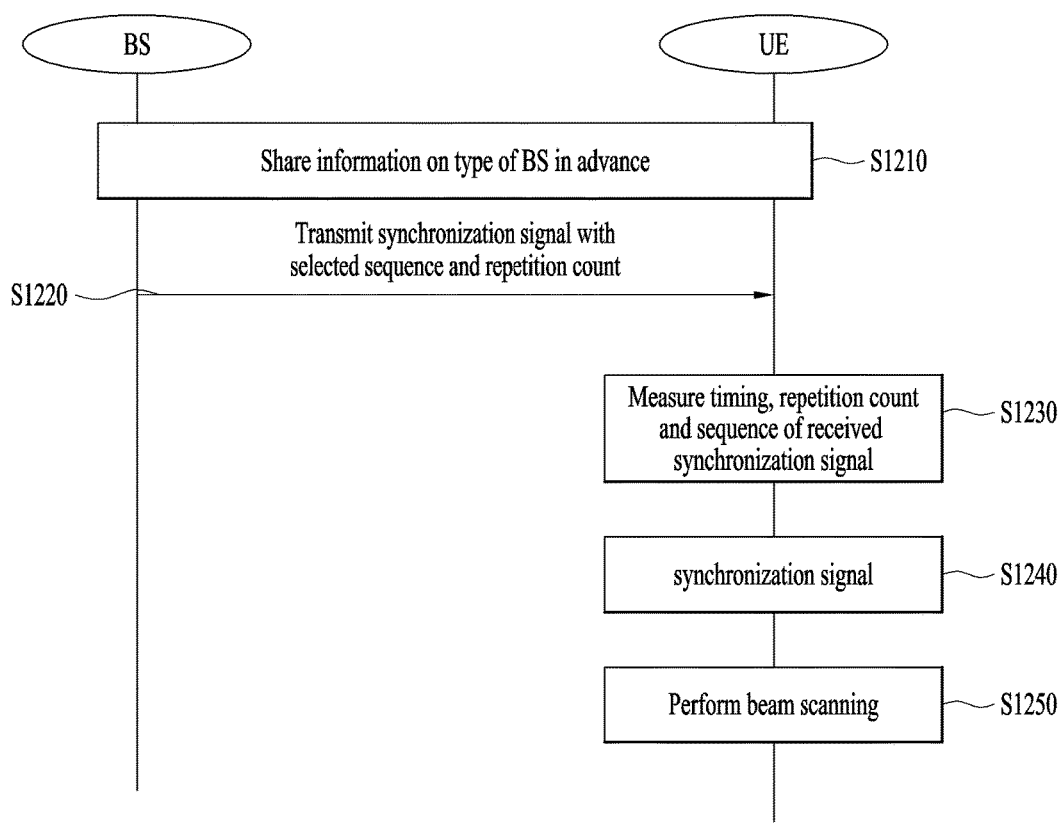
FIG. 12 is a flowchart for a synchronization signal transmitting/receiving method related to the present invention.

FIG. 12 is a flowchart for a synchronization signal transmitting/receiving method according to a proposed embodiment.

A cellar network of a related art assumes a macro cell in which a single base station services a wide area. Yet, a recent cellular network allows installation of a plurality of base stations having small transmission output within a macro cell. Such base stations with small outputs configure a small cell that services a narrow area.

Consequently, HetNet (heterogeneous network) is configured in a manner that a plurality of small cells exist within a single macro cell, which may considerably increase overall capacity of the network. Particularly, in case that a base station can actively support various ranges of service areas, capacity of such a network can be efficiently raised according to a network situation.

Meanwhile, a service area of a base station is determined by a delivery range of a synchronization signal. This is because a synchronization signal is transmitted in beam width as wide as possible so as to be received by a multitude of unspecific UEs. On the other hand, since a data signal is transmitted UE-specifically, it can be transmitted in narrow beam width. Consequently, in case of assuming the same transmit power, a synchronization signal having a wide beam width has a transmission distance shorter than that of a data signal having a narrow beam width. In the following, a service area means an area defined with a transmission distance of a synchronization signal.

A service area of a base station may be determined using a transmit power of the base station, a beam width, and a synchronization signal transmission repetition count. For example, if a repetition count is raised while maintaining a transmit power and a beam width, a service area is increased.

Based on the above substance, a method of transmitting a synchronization signal to enable a base station to efficiently adjust a service area and a method for a UE to receive the synchronization signal correspondingly are described as follows.

First of all, a type (or sort) of a base station is described. Base stations can be categorized into a plurality of types by a cell property, a pattern of a synchronization signal, and a pattern of a beam scanning signal. The cell property means a property defined by at least one of a transmission output of a base station, a cell radius, the number of subsectors, each of which is an area serviced by a single synchronization signal, and a sequence index of a synchronization signal. A pattern of a synchronization signal is a property defined as at least one of a beam width of a synchronization signal and a transmission repetition count of a synchronization signal. A pattern of a beam scanning signal is a property defined by at least one of a beam width of a beam scanning signal, the number of beam scanning signals and the number of OFDM symbols for a beam scanning signal.

Table 4 in the following shows a type of a base station defined by the cell property, the pattern of the synchronization signal and the pattern of the beam scanning signal.

TABLE 4

| BS type | Transmit power (dBm) | Cell radius (m) | # of subsectors | Beam width of synchronization signal | Repetition count of synchronization signal | Beam width of scanning signal | Repetition count of beam scanning signal | # of OFDM Symbols of beam scanning signal | Sequence number band |
|---|---|---|---|---|---|---|---|---|---|
| Macro A | 40 | 500 | 1 | 60' | 4 | 15' | 4 | 4 | 0~127 |
| Macro B | 40 | 500 | 2 | 30' | 2 | 15' | 2 | 2 | 0~127 |

TABLE 4-continued

| BS type | Transmit power (dBm) | Cell radius (m) | # of subsectors | Beam width of synchronization signal | Repetition count of synchronization signal | Beam width of beam scanning signal | Repetition count of beam scanning signal | # of OFDM Symbols of beam scanning signal | Sequence number band |
|---|---|---|---|---|---|---|---|---|---|
| Macro C | 40 | 500 | 4 | 15' | 1 | — | — | — | 0~127 |
| Micro A | 27 | 200 | 1 | 60' | 4 | 15' | 4 | 4 | 128~255 |
| Micro B | 27 | 200 | 2 | 30' | 2 | 15' | 2 | 2 | 128~255 |
| Micro C | 27 | 200 | 4 | 15' | 1 | — | — | — | 128~255 |

In FIG. 4, sector 1 is defined as {A1, A2, A3, A4} and sector 2 is defined as {A1, A2, A3, A4, B1, B2, B3, B4}. Here, the following description is made by taking a base station of macro B type as one example. Since a transmit power is 500 m, the base station supports the sector 2. Since the sector 2 has a synchronization signal beam width of the base station is 30', it is divided into two subsectors {A1, A2, B1, B2} and {A3, A4, B3, B4}. Namely, since a repetition count of a synchronization signal is 2, the base station transmits a synchronization signal twice each by alternating between the subsector 1 and the subsector 2. In doing so, a sequence of the used synchronization signal is selected from bands 0~127. Moreover, since a beam width of a beam scanning signal is 15' and a repetition count is 2, the base station transmits a beam scanning signal to a UE by changing a direction for each subsector.

Namely, a base station transmits a synchronization signal and a beam scanning signal according to a parameter determined beforehand in response to a base station type. Meanwhile, a UE is already aware of information on the base station type and the corresponding parameter. Hence, if the base statin generates a synchronization signal using a specific sequence and then transmits the synchronization signal according to a prescribed repetition count, the UE can infer information on a type of the base station.

In particular, the UE obtains information on a timing, a repetition count and a sequence from a synchronization signal received from the base station. And, the UE can grasp a type of the base station from the measured repetition count and the information on the sequence of the synchronization signal.

For example, let's consider a case that a UE located in a subsector 1 in Table 4 receives a synchronization signal generated by a sequence #122 twice repeatedly. The UE estimates a timing, a repetition count and a sequence of a synchronization signal according to Equation 16.

$$\{\hat{n}, \hat{M}, \hat{k}\} = \arg\max_{\tilde{n},\tilde{M},\tilde{k}} \frac{\left|\sum_{i=0}^{\tilde{M}-1} y_{\tilde{n},i}^H s_{\tilde{k}}\right|}{\sum_{i=0}^{\tilde{M}-1} \left|y_{\tilde{n},i}^H s_{\tilde{k}}\right|}$$ [Equation 16]

Equation 16 is an equation created from adding factors for a repetition count and sequence of a synchronization signal to Equation 4 indicating a timing of the synchronization signal. In Equation 16, M indicates a repetition count of synchronization signal and k indicates a sequence index of the synchronization signal. Equation 16 shows a maximum result value when a repetition count and a sequence index are matched as well as a timing of a synchronization signal. Hence, the UE can obtain information on a repetition count and sequence band of a received synchronization signal, and then grasps a type of a base station having transmitted the synchronization signal by comparing the obtained information with information on a previously stored base station type. So to speak, if the UE is aware that a repetition count of a synchronization signal is M and that k is 122, the UE determines that the base station is the base station of Macro B type from Table 4. Meanwhile, in Equation 16, $\tilde{n},\tilde{M},\tilde{k}$ are trial values used in calculating Equation 16, $\hat{n},\hat{M},\hat{k}$ indicate a reception timing of a synchronization signal, a repetition count of the synchronization signal, and a band having a sequence number of $\hat{k}$ synchronization signal belong thereto, respectively, for maximizing the calculation result of Equation 16, $y_{\hat{n},i}$ indicates a received synchronization signal, and $s_{\hat{k}}$ indicates a signal transmitted by the base station.

Based on the information on the grasped base station type, the UE performs a beam scanning process. Since the UE is aware of the base station type, it is able to grasp a beam width of a beam scanning signal, a repetition count of the beam scanning signal, and the number of OFDM symbols of the beam scanning signal. Hence, the UE receives beams transmitted from the base station and selects a beam determined as most appropriate from the received beams. Then, the UE feeds back information on the selected beam to the base station, thereby enabling the base station to transmit data on the beam optimized for the UE.

If a pattern of a beam scanning signal according to a type of a base station is not known to a UE in advance, the base station and the UE should use a pre-agreed beam scanning signal pattern only or the UE should estimate a pattern by a blind scheme. In the scheme of using a pre-agreed pattern, there is a problem that the base station is unable to enforce various beam scanning policies. In the blind scheme, high implementation complexity is required for the UE. On the other hand, according to the proposed scheme, since a UE is simply aware of a type of a base station, the UE can be aware of beam scanning related parameters of the base station in advance. Hence, complexity and efficiency of a beam scanning procedure are raised.

Meanwhile, a UE moving fast prefers a base statin having a wide service area of a synchronization signal. If the fast moving UE selects a base station having a narrow service area of a synchronization signal, handover may occur frequently. Hence, the UE checks a type of a base station based on an estimated repetition count of a synchronization signal and a sequence of the synchronization signal, thereby grasping an area serviced by the corresponding base station instantly. Hence, the fast moving UE can select a macro base station, which has a high repetition count and a wide service area, as a base station to be connected by the UE itself.

Meanwhile, FIG. 12 shows the aforementioned embodiments according to a time-series flow. Hence, it is apparent that the aforementioned contents are applicable to FIG. 12 identically or similarly despite failing to be illustrated in or described with reference to FIG. 12 in detail.

First of all, a base station is categorized into one of a plurality of types based on at least one of a cell property, a synchronization signal pattern, and a beam scanning signal pattern, and information on a type of the base station and parameters according to the base station type is shared beforehand between the base station and a UE [S1210]. The base station broadcasts a synchronization signal to a multitude of unspecific UEs located in a service area of the base station [S1220]. In doing so, the synchronization signal is broadcasted using a repetition count and sequence previously determined according to the type of the base station.

Having received the synchronization signal, the UE measures a reception timing, a repetition count and a sequence respectively [S1230]. Subsequently, by comparing parameters of the received synchronization signal with information on the base station type retained in the step S1210, the UE grasps that the base station corresponds to which type [S1240]. Having obtained the information on the type of the base station, the UE performs a beam scanning process using beam scanning related parameters (beam width of a beam scanning signal, a repetition count, the number of OFDM symbols) of the base station [S1250].

3. Proposed Synchronization Signal Transceiving Method 2

Figure 13:
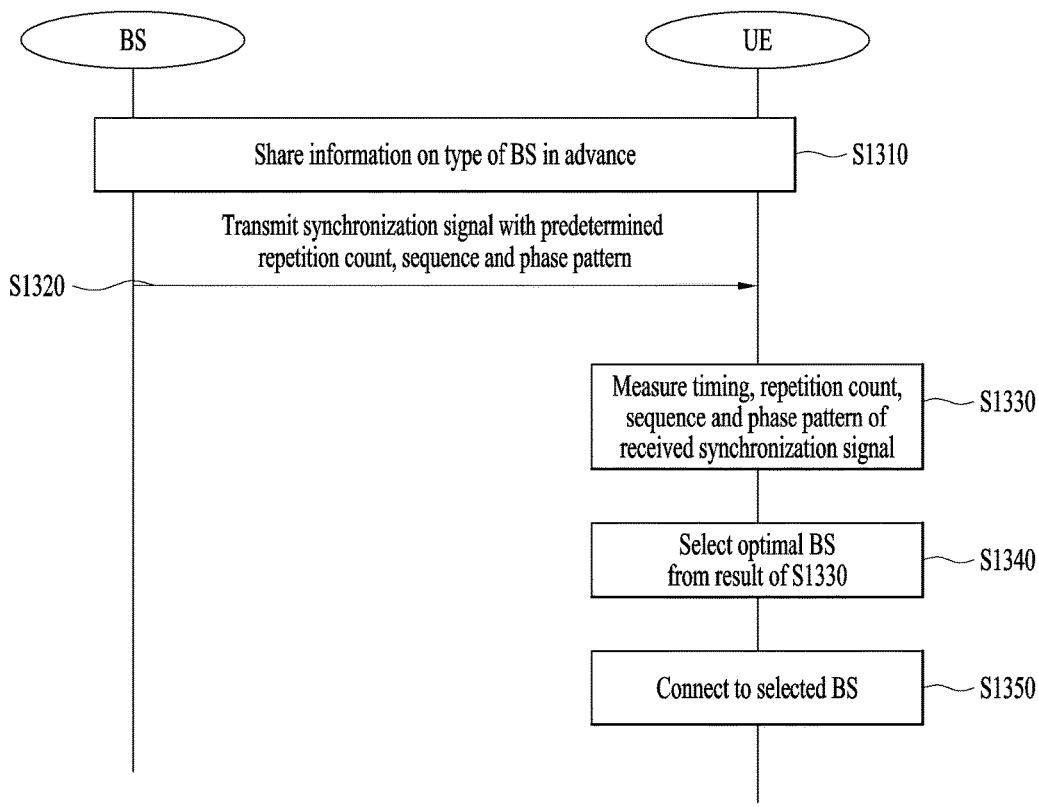
FIG. 13 is a flowchart for a synchronization signal transmitting/receiving method according to a proposed embodiment.

FIG. 13 is a flowchart for a synchronization signal transmitting/receiving method according to a proposed embodiment. With reference to FIG. 13, a synchronization signal transceiving method using a phase pattern between a user equipment (UE) and a base station (BS) is described.

According to one embodiment, a synchronization signal broadcasted by a base station can be categorized by a phase pattern vector as well as a repetition count of synchronization signal transmission or a band of a sequence. The phase pattern vector means a pattern of a phase changed per repetition in the course of transmitting a specific sequence as a synchronization signal. Regarding the phase pattern vector, patterns having the same repetition count are orthogonal or quasi-orthogonal to each other. If two patterns are quasi-orthogonal, it means a case that the two patterns can be eliminated at a sufficiently low level despite failing to be perfectly cancelled out.

One example of implementing a phase pattern vector is described with reference to Table 5 showing an example that different phase pattern vectors are applied to repetition counts, respectively. Here, a size of a phase vector corresponding to each repetition count becomes equal to the corresponding repetition count.

TABLE 5

| Repetition count | Phase pattern vector index | Phase pattern vector |
|---|---|---|
| 1 | 0 | 1 |
| 2 | 0 | [1 1] |
| 4 | 1 | [1 -1] |
| 4 | 0 | [1 1 1 1] |
| 4 | 1 | [1 1 -1 -1] |
| 4 | 2 | [1 -1 1 -1] |
| 4 | 3 | [1 -1 -1 1] |
| 8 | 0 | [1 1 1 1 1 1 1 1] |
| 8 | 1 | [1 1 1 1 -1 -1 -1 -1] |

A sequence set or a sequence band is described as follows. Equation 17 shows a sequence set configured with orthogonal or quasi-orthogonal sequences.

$$\{s_1, s_2, \ldots, s_V\} \quad \text{[Equation 17]}$$

where $$s_i^H s_j = \begin{cases} 1 & \text{for } i = j \\ \zeta & \text{for } i \neq j \end{cases}$$

In Equation 17, $s_i$ indicates an $i^{th}$ sequence, and V indicates a size of a sequence set. If $\zeta=0$, sequences of the corresponding sequence set are orthogonal to each other. If $\zeta \neq 0$, sequences are quasi-orthogonal to each other.

Based on the aforementioned sequence set and phase pattern vector, a base station can generate a synchronization signal. Particularly, the base station selects a phase pattern vector corresponding to a predetermined repetition count determined according to a base station type and selects a random sequence from the sequence set. Subsequently, the base station generates a downlink (DL) synchronization signal using the selected sequence and phase pattern vector.

For example, if a base station has a base station type of a macro A in Table 4, a repetition count of a synchronization signal is 4. Subsequently, assume a case that the BS selects [1 1 -1 -1] corresponding to a phase pattern vector 1 in Table 5 and also selects a sequence $s_{96}$. Here, the BS finally generates 4 contiguous synchronization signals according to Equation 18 in the following.

$$s_{96} \rightarrow s_{96} \rightarrow -s_{96} \rightarrow -s_{96} \quad \text{[Equation 18]}$$

According to one embodiment, a base station may use a predetermined sequence instead of selecting a random sequence from a sequence set. Generally, synchronization signals of base stations adjacent to each other may cause mutual interference. To minimize such interference, base stations are set to use different sequences in the course of generating synchronization signals, respectively. In this case, the lower inter-sequence correlation gets, the less interference is generated. Hence, adjacent base stations use sequences orthogonal (or, quasi-orthogonal) to each other.

For such reasons, a network assigns sequences to base stations by avoiding overlapping, and the base stations can use the predetermined sequences assigned to themselves for the generation of synchronization signals. Moreover, as described above, a phase pattern vector enables a UE to distinguish synchronization signals for the same sequence. Hence, the network may assign a phase pattern vector to a base station in advance as well as a sequence. In such an embodiment, a base station generates a synchronization signal using a predetermined sequence and a predetermined phase pattern vector.

According to another embodiment, in assigning a sequence and phase pattern of base stations having the same repetition count of a synchronization signal, at least one of the sequence and the phase pattern can be set different.

For example, assume a case that a random base station A and a random base station B have the same repetition count (e.g., 2) of a synchronization signal. In this case, if different sequences $S_{64}$ and $S_{65}$ are assigned to the base station A and the base station B, respectively, although the base station A and the base station B use the same phase pattern vector, influence of interference is not caused to a UE. On the contrary, when the same sequence $S_{64}$ is assigned to the base station A and the base station B, only if the base station A and the base station B use different phase pattern vectors, respectively, influence of interference caused to a UE can be eliminated. So to speak, between base stations having the same repetition count of synchronization signal transmission, at least one of a sequence index and an index of a phase pattern vector can be set different.

On the other hand, between base stations having different repetition counts of synchronization signal transmission, sequences should be set different. Namely, if the same sequence and different phase pattern vectors are set between base stations having different repetition counts, a synchronization signal generated by one base station may appear to be identical to a portion of a synchronization signal of another base station.

Table 6 shows an example of a sequence band assigned between base stations having different repetition counts.

TABLE 6

| Repetition count | Sequence index |
|---|---|
| 1 | 0~63 |
| 2 | 64~95 |
| 4 | 96~111 |
| 8 | 112~127 |

The following description is made by taking Table 6 as example. Assume a case that the base station A and the base station B have the repetition count 2 and the repetition count 4, respectively. In this case, a prescribed one of sequences $S_{64}$ to $S_{95}$ is assigned to the base station A and a prescribed one of sequences $S_{96}$ to $S_{111}$ is assigned to the base station B. In such an embodiment, phase pattern vectors respectively assigned to the base station A and the base station B may be equal to or different from each other. Namely, since sequence bands are different, although the phase pattern vectors assigned to the two base stations are equal to each other, a problem of interference is not caused.

According to another embodiment, if determining that there is small synchronization signal interference between base stations, a network can assign the same sequence and phase pattern vector to the base stations irrespective of a repetition count. Namely, as two base stations are sufficiently spaced apart from each other, if a level of interference between synchronization signals is zero or negligibly small, the same sequence and the same phase pattern can be assigned to the base stations irrespective of the repetition count.

Meanwhile, a UE can process a synchronization signal in consideration of the aforementioned timing, repetition count, sequence and phase pattern vector of the synchronization signal. Namely, the UE estimates timings, repetition counts, sequences and phase pattern vector indexes from repeatedly received downlink synchronization signals, and such an estimating process can be performed according to Equation 19.

$$\{\hat{n}, \hat{M}, \hat{k}, \hat{t}\} = \arg\max_{\hat{n},\hat{M},\hat{k},\hat{t}} \left| \sum_{i=0}^{\hat{M}-1} (x_{i,\hat{M}}^{\hat{t}})^* y_{\hat{n},\hat{t}}^H s_{\hat{k}} \right|^2 \quad \text{[Equation 19]}$$

Terms in Equation 19 are the same as described in Equation 4 and Equation 16. Namely, $\hat{n}$ indicates a start timing of a measured frame, $\hat{M}$ indicates a repetition count, $\hat{k}$ indicates a measured sequence index, $\hat{t}$ indicates an index of a measured phase pattern vector, $y_{\tilde{n},i}$ indicates a received synchronization signal, and $s_{\tilde{k}}$ indicates a $\tilde{k}^{th}$ sequence transmitted by a base station. Moreover, $\tilde{n}$, $\tilde{M},\tilde{k}$, and $\tilde{t}$ indicate trial values used for a process for calculating Equation 19, and $x_{i,\tilde{M}}^{\tilde{t}}$ indicates an $i^{th}$ element of a phase pattern vector having a repetition count $\tilde{M}$ and an index $\tilde{t}$. For example, if M=4 and t=1, it becomes $[x_{0,4}^1 \, x_{1,4}^1 \, x_{2,4}^1 \, x_{3,4}^1] = [1 \; 1 \; -1 \; -1]$ with reference to Table 5.

Consequently, Equation 19 means a process for a UE to select an optimal one of all combinations of frame start timing, sequence index and phase pattern vector indexes from repeatedly received synchronization signals.

A detailed example is described as follows. First of all, assume that a repetition count of each of the base station A and the base station B is M=4. Moreover, assume that a sequence used by the two base stations is k=97 ($s_{97}$), and assume that phase pattern vectors of the base station A and the base station B are [1 1 −1 −1] and [1 −1 −1 1], respectively. here, downlink synchronization signals transmitted by the two base stations are expressed as Equation 20.

A: $s_{97} \to s_{97} \to -s_{97} \to -s_{97}$

B: $s_{97} \to -s_{97} \to -s_{97} \to s_{97}$      [Equation 20]

Moreover, in the following description, $n_A$ and $n_B$ indicate a frame start location between the base station A and the UE and a frame start location between the base station B and the UE, respectively.

In such an example, in order to make a description by focusing on a fact that a UE can distinguish a synchronization signal using a phase pattern vector only, the UE is assumed as performing perfect synchronization ($\hat{n}=n_A n_B$). And, all sequences in a sequence set are orthogonal to each other. Under this condition, $\alpha_{n,i,k}$ that is the result from calculation according to Equation 19 is defined as Equation 21.

$$\alpha_{n,i,k} \triangleq y_{n,i}^H s_k \quad \text{[Equation 21]}$$

Since Equation 21 assumes a case that the base station A and the UE are synchronized at the perfect timing, as n is omitted, it is expressed as $\alpha_{i,k}=\alpha_{n=n_A,i,k} \triangleq y_{n=n_A,i}^H s_k$. Meanwhile $\alpha_{i,k}^u$ is defined as Equation 22. In the following Equation 22, $y_i^u$ indicates a signal received by the UE when a $u^{th}$ base station transmits a synchronization signal only but the rest of the base stations do not transmit synchronization signals.

$$\alpha_{i,k}^u \triangleq (y_i^u)^H s_k \quad \text{[Equation 22]}$$

In a situation that considers the base station A and the base station B, the relation between $y_i$ and $y_i^u$ is expressed as Equation 23.

$$y_i = y_i^A + y_i^B \quad \text{[Equation 23]}$$

Finally, if a channel is flat and has no noise without changing according to time, the relation of $x_{0,j}^s \alpha_{0,k}^u = \ldots = x_{M-1,j}^s \alpha_{M-1,k}^u = \alpha_k^u$ is established in consideration of Equation 19 and Equation 21. Under this condition, a result of the correlation value calculated by the UE according to Equation 19 is expressed as Table 7.

TABLE 7

| Repetition count | Phase pattern vector index | Results (correlation) of Equation 19 |
|---|---|---|
| 1 | 0 | $|\alpha_{0,k}|^2 \to 0, 0 \leq k \leq 63$ |
| 2 | 0 | $|\alpha_{0,k} + \alpha_{1,k}|^2 \to 0, 64 \leq k \leq 95$ |
| 2 | 1 | $|\alpha_{0,k} - \alpha_{1,k}|^2 \to 0, 64 \leq k \leq 95$ |

TABLE 7-continued

| Repetition count | Phase pattern vector index | Results (correlation) of Equation 19 |
|---|---|---|
| 4 | 0 | $\|\alpha_{0,k} + \alpha_{1,k} + \alpha_{2,k} + \alpha_{3,k}\|^2 \to 0, 96 \leq k \leq 111 \ \& \ k \neq 97$ |
|   |   | $\|\alpha_{0,k} + \alpha_{1,k} + \alpha_{2,k} + \alpha_{3,k}\|^2 \to 0, k = 97$ |
| 4 | 1 | $\|\alpha_{0,k} + \alpha_{1,k} - \alpha_{2,k} - \alpha_{3,k}\|^2 \to 0, 96 \leq k \leq 111 \ \& \ k \neq 97$ |
|   |   | $\|\alpha_{0,k} + \alpha_{1,k} - \alpha_{2,k} - \alpha_{3,k}\|^2 \to \alpha_{97}^A, k = 97$ |
| 4 | 2 | $\|\alpha_{0,k} - \alpha_{1,k} + \alpha_{2,k} - \alpha_{3,k}\|^2 \to 0, 96 \leq k \leq 111 \ \& \ k \neq 97$ |
|   |   | $\|\alpha_{0,k} - \alpha_{1,k} + \alpha_{2,k} - \alpha_{3,k}\|^2 \to 0, k = 97$ |
| 4 | 3 | $\|\alpha_{0,k} - \alpha_{1,k} - \alpha_{2,k} + \alpha_{3,k}\|^2 \to 0, 96 \leq k \leq 111 \ \& \ k \neq 97$ |
|   |   | $\|\alpha_{0,k} - \alpha_{1,k} - \alpha_{2,k} + \alpha_{3,k}\|^2 \to \alpha_{97}^B, k = 97$ |
| 8 | 0 | $\|\alpha_{0,k} + \alpha_{1,k} + \alpha_{2,k} + \alpha_{3,k} + \alpha_{4,k} + \alpha_{5,k} + \alpha_{6,k} + \alpha_{7,k}\|^2 \to 0, 112 \leq k \leq 127$ |
| 8 | 1 | $\|\alpha_{0,k} + \alpha_{1,k} + \alpha_{2,k} + \alpha_{3,k} - \alpha_{4,k} - \alpha_{5,k} - \alpha_{6,k} - \alpha_{7,k}\|^2 \to 0, 112 \leq k \leq 127$ |

The following can be observed from Table 7. First of all, since, sequences selected from different sequence bands are used for synchronization signals failing to have a repetition count '4', all result values of Equation 19 are zero. Likewise, in case that a repetition count is 4 but k is not equal to 97, a result value is 0 as well. Eventually, the UE can find the repetition count (M=4) and 'k=7' of the base station using a sequence only.

In case of M=4, only if phase pattern vector indexes are 1 and 3, result values of the calculation become $\alpha_{97}^A$ and $\alpha_{97}^B$ respectively. Eventually, the UE can simultaneously detect downlink synchronization signals of the base station A and the base station B and also distinguish synchronization signals of the two base stations from the result values. Despite that the two base stations use the same sequence ($s_{97}$), the reason why the UE can distinguish it is that the two base stations use different phase pattern vectors.

If $\alpha_{97}^A > \alpha_{97}^B$, the UE selects the base station A. Namely, using the result value of Equation 19, the UE can select an optimal base station determined as having a best quality of communication connection.

According to one embodiment, the UE can select an optimal base station by comparing the calculation result according to Equation 19 with a previous calculation result. In particular, if a value currently calculated by the UE is smaller than a value calculated in a previous process, although a correlation value of a currently calculated synchronization signal is not 0, the calculation result value is discarded. On the contrary, if a value greater than the value calculated in the previous process appears as a calculation result, a greatest value among the calculated result values is substituted with the currently calculated value. Subsequently, the HE can continue to progress such a process up to a predetermined window size, and is able to select a base station, which has sent a synchronization signal having a greatest value in the calculation result, as an optimal base station.

Such a window size becomes a size of a candidate of a frame start point ñ. If the frame structure of FIG. 5 is taken as an example, in order to find a start point of a frame, the LIE should set a window size to $Q \times P \times T \times (N+N_g)$. Namely, a range of the frame start point is set to $0 \leq ñ \leq Q \times P \times T \times (N+N_g)-1$. Here, sizes of N and $N_g$ indicate a size of OFDM Symbol and a length of CP, respectively.

Subsequently, if sizes of ñ, k, and $\tilde{M}$ are set to $Q \times P \times T \times (N+N_g)$, V and R respectively, the total number of possible candidates of ñ becomes $Q \times P \times T \times (N+N_g) \times V \times R$. If the UE saves them all and selects a greatest value, a considerable amount of memory is demanded. Meanwhile, if the UE compares the result values and then saves a highest calculation value only according to the above embodiment, a memory for storing a single corresponding value is demanded only, whereby a UE's memory demand amount can be improved.

According to another embodiment, if a result value appears to be equal to or greater than a prescribed maximum threshold in the course of calculating a correlation value according to Equation 19, the UE determines that the synchronization is sufficiently performed and does not further progress the calculation. A procedure for the UE to progress an unnecessary calculation process can be skipped according to the setting of the maximum threshold. As the above algorithm can stop calculating in the middle of the range of $0 \leq ñ = Q \times P \times T \times (N+N_g)-1$, complexity and UE's delay generation can be minimized.

On the other hand, if a calculation result exceeding a minimum threshold in the window size is not detected, the UE resets the window and restarts the calculation process. Namely, if a calculation procedure proceeds despite failing to receive a synchronization signal, an incorrect synchronization (i.e., a false alarm) occurs. Hence, if a calculation result value fails to meet the minimum threshold in a selected section, although a highest value is detected, the UE does not select it as a frame start point.

FIG. 13 is a flowchart showing the aforementioned embodiments according to a flow of time series. Hence, it can be easily apprehended that the aforementioned embodiments are applicable identically or similarly despite failing to be shown or described in detail in FIG. 13.

First of all, a step S1310 is already described in FIG. 12 and its details shall be omitted. Using a predetermined repetition count according to a base station type and a sequence and phase pattern assigned by a network beforehand, a base station generates a synchronization signal and then broadcasts it to a UE [S1320].

Having received the synchronization signal, a UE measures timing, repetition count, sequence index and phase pattern index of the received synchronization signal according to the algorithm of Equation 19 [S1330]. Subsequently, the UE selects a base station having a greatest correlation value as an optimal base station by comparing a calculation result value [S1340], and establishes a connection to the selected base station [S1350]. In the steps S1330 and S1340, the UE may perform a procedure for comparing and updating a calculation result during a prescribed window size. For example, the UE may select a candidate having a greatest result value from result values greater than a minimum threshold. Or, if a result value greater than a maximum threshold appears, the UE may select the corresponding result value.

4. Apparatus Configuration

Figure 14:
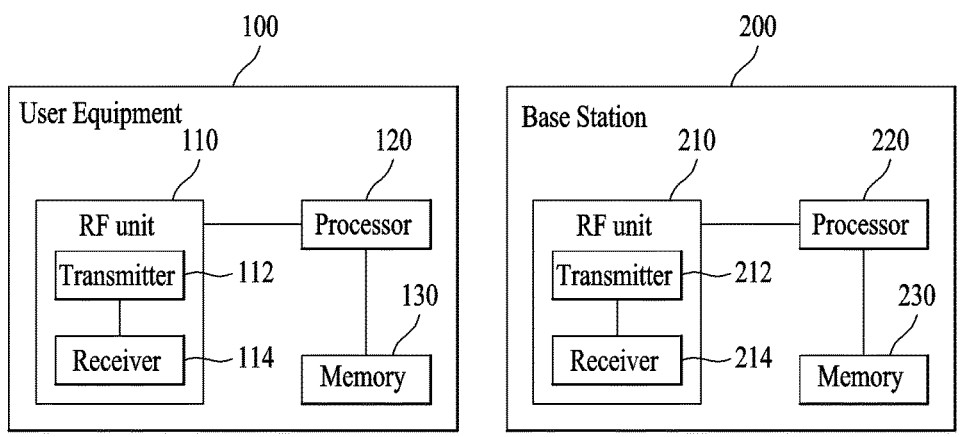
FIG. 14 is a diagram showing a configuration of a user equipment (UE) and a base station (BS) related to a proposed embodiment.

FIG. 14 is a block diagram showing the configuration of a user equipment and a base station according to one embodiment of the present invention. In FIG. 14, the user equipment 100 and the base station 200 may include radio frequency (RF) units 110 and 210, processors 120 and 220 and memories 130 and 30, respectively. Although a 1:1 communication environment between the user equipment 100 and the base station 200 is shown in FIG. 14, a communication environment may be established between a plurality of user equipment and the base station. In addition, the base station 200 shown in FIG. 14 is applicable to a macro cell base station and a small cell base station.

The RF units 110 and 210 may include transmitters 112 and 212 nd receivers 114 and 214, respectively. The transmitter 112 and the receiver 114 of the user equipment 100 are configured to transmit and receive signals to and from the base station 200 and other user equipments and the processor 120 is functionally connected to the transmitter 112 and the receiver 114 to control a process of, at the transmitter 112 and the receiver 114, transmitting and receiving signals to and from other apparatuses. The processor 120 processes a signal to be transmitted, sends the processed signal to the transmitter 112 and processes a signal received by the receiver 114. If necessary, the processor 120 may store information included in an exchanged message in the memory 130. By this structure, the user equipment 100 may perform the methods of the various embodiments of the present invention.

The transmitter 212 and the receiver 214 of the base station 200 are configured to transmit and receive signals to and from another base station and user equipments and the processor 220 are functionally connected to the transmitter 212 and the receiver 214 to control a process of, at the transmitter 212 and the receiver 214, transmitting and receiving signals to and from other apparatuses. The processor 220 processes a signal to be transmitted, sends the processed signal to the transmitter 212 and processes a signal received by the receiver 214. If necessary, the processor 220 may store information included in an exchanged message in the memory 230. By this structure, the base station 200 may perform the methods of the various embodiments of the present invention.

The processors 120 and 220 of the user equipment 100 and the base station 200 instruct (for example, control, adjust, or manage) the operations of the user equipment 100 and the base station 200, respectively. The processors 120 and 220 may be connected to the memories 130and 230 or storing program code and data, respectively. The memories 130 and 230 are respectively connected to the processors 120 and 220 so as to store operating systems, applications and general files.

The processors 120 and 220 of the present invention may be called controllers, microcontrollers, microprocessors, microcomputers, etc. The processors 120 and 220 may be implemented by hardware, firmware, software, or a combination thereof.

If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 120 and 220.

Meanwhile, the aforementioned method may be implemented as programs executable in computers and executed in general computers that operate the programs using computer readable media. In addition, data used in the aforementioned method may be recorded in computer readable recording media through various means. It should be understood that program storage devices that can be used to describe storage devices including computer code executable to perform various methods of the present invention do not include temporary objects such as carrier waves or signals. The computer readable media include storage media such as magnetic recording media (e.g. ROM, floppy disk and hard disk) and optical reading media (e.g. CD-ROM and DVD).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The aforementioned synchronization signal receiving method is applicable to various wireless communication systems including an IEEE 802.16x system and an IEEE 802.11x system as well as to a 3GPP LTE/LTE-A system. Moreover, a proposed method is applicable to an mmWave communication system that uses an ultra-high frequency band.

What is claimed is:

1. A method of receiving a plurality of synchronization signals by a user equipment in a wireless communication system, the method comprising:
receiving the plurality of synchronization signals generated using a predetermined repetition count, a sequence and a phase pattern vector from a plurality of base stations (BSs), respectively;
measuring a start timing of a frame, a sequence index and an index of a phase pattern vector using the plurality of synchronization signals;
selecting a BS having a highest correlation value calculated from the measurements from the plurality of BSs; and
establishing a connection to the selected BS,
wherein the phase pattern vector is used for the BS to change a phase of the sequence by the repetition count.

2. The method of claim 1, wherein at least one of the sequence and the phase pattern vector is assigned differently between adjacent BSs.

3. The method of claim 1, wherein phase pattern vectors corresponding to an identical sequence and an identical repetition count are orthogonal or quasi-orthogonal to each other.

4. The method of claim 1, wherein different sequence bands are assigned between BSs having different repetition counts set therefor.

5. The method of claim 1, wherein the measuring is performed based on an equation as follows:

$$\{\hat{n}, \hat{M}, \hat{k}, \hat{t}\} = \arg\max_{\hat{n},\hat{M},\hat{k},\hat{t}} \left| \sum_{i=0}^{\hat{M}-1} (x_{i,\hat{M}}^{i})^{*} y_{\hat{n},i}^{H} S_{\hat{k}} \right|^{2} \quad \text{[Equation]}$$

wherein $\hat{n}$ indicates a start timing of the measured frame, $\hat{M}$ indicates the measured repetition count, $\hat{k}$ indicates the measured sequence index, $\hat{t}$ indicatesan index of the measured phase pattern vector, $y_{\hat{n},i}$ indicates the received synchronization signal, and $S_{\hat{k}}$ indicates a signal transmitted by the BS, ñ, M̂, k̃, and t̃ indicate trial values used for a process of calculating the equation, and $x_{i,\tilde{M}}^{\tilde{t}}$ indicates an $i^{th}$ element of a phase pattern vector having a repetition count M̃ and an index t̃.

6. The method of claim 1, wherein the selecting comprises selecting the BS by updating the measurement result during a predetermined window.

7. The method of claim 1, wherein the selecting comprises stopping the measuring, when the measurement result is equal to or greater than a threshold during a predetermined window.

8. A user equipment (UE) receiving a plurality of synchronization signals in a wireless communication system, the UE comprising:
 a transmitter;
 a receiver; and
 a processor, operatively coupled to the transmitter and the receiver, wherein the processor is configured to:
 control the receiver to receive the plurality of synchronization signals generated using a predetermined repetition count, a sequence and a phase pattern vector from a plurality of base stations (BSs), respectively,
 measure a start timing of a frame, a sequence index and an index of a phase pattern vector using the plurality of synchronization signals,
 select a BS having a highest correlation value calculated from the measurements from the plurality of BSs, and
 establish a connection to the selected BS,
 wherein the phase pattern vector is used for the BS to change a phase of the sequence by the repetition count.

9. The UE of claim 8, wherein at least one of the sequence and the phase pattern vector is assigned differently between adjacent BSs.

10. The UE of claim 8, wherein phase pattern vectors corresponding to an identical sequence and an identical repetition count are orthogonal or quasi-orthogonal to each other.

11. The UE of claim 8, wherein different sequence bands are assigned between BSs having different repetition counts set therefor.

12. The user UE of claim 8, wherein the measuring is performed based on an equation as follows:

$$\{\hat{n}, \hat{M}, \hat{k}, \hat{t}\} = \arg\max_{\tilde{n},\tilde{M},\tilde{k},\tilde{t}} \left| \sum_{i=0}^{\tilde{M}-1} (x_{i,\tilde{M}}^{\tilde{t}}) * y_{\tilde{n},\tilde{t}}^H s_{\tilde{k}} \right|^2, \quad \text{[Equation]}$$

wherein ñ indicates a start timing of the measured frame, M̂ indicates the measured repetition count, k̂ indicates the measured sequence index, t̂ indicates an index of the measured phase pattern vector, $y_{\tilde{n},i}$ indicates the received synchronization signal, and $S_{\tilde{k}}$ indicates a signal transmitted by the BS, ñ, M̃, k̃ and t̃ indicate trial values used for a process of calculating the equation, and $x_{t,\tilde{M}}^{\tilde{t}}$ indicates an $i^{th}$ element of a phase pattern vector having a repetition count M̃ and an index t̃.

13. The UE of claim 8, wherein the processor is further configured to:
 select the BS by updating the measurement result during a predetermined window.

14. The UE of claim 8, wherein the processor is further configured to:
 stop the measuring, when the measurement result is equal to or greater than a threshold during a predetermined window.

* * * * *